FIG.1

Oct. 26, 1971      W. B. ENSINGER      3,614,894
GYROSCOPE FLEXURE HINGE ASSEMBLY
Filed Jan. 30, 1969      6 Sheets-Sheet 3

INVENTOR
WILLIS B. ENSINGER
BY
ATTORNEY

Oct. 26, 1971  W. B. ENSINGER  3,614,894
GYROSCOPE FLEXURE HINGE ASSEMBLY
Filed Jan. 30, 1969  6 Sheets-Sheet 4

INVENTOR
WILLIS B. ENSINGER
BY *S. Michael Bender*
*S. A. Giverstone*
ATTORNEY

INVENTOR
WILLIS B. ENSINGER
BY
ATTORNEY

United States Patent Office 3,614,894
Patented Oct. 26, 1971

3,614,894
GYROSCOPE FLEXURE HINGE ASSEMBLY
Willis B. Ensinger, Silver Spring, Md., assignor to
The Singer Company, New York, N.Y.
Filed Jan. 30, 1969, Ser. No. 795,302
Int. Cl. F16c *29/00;* G01c *19/04*
U.S. Cl. 74—5
14 Claims

ABSTRACT OF THE DISCLOSURE

An improved flexure hinge suspension for use in free-rotor displacement type gyroscopes is provided comprising an inner hinge unit and an outer hinge unit concentrically nested one within the other in a generally parallel manner coaxial with the gyro's spin or reference axis. Each hinge unit, in turn, comprises a frictionless, four-bar, two-axis, universal-joint suspension element for supporting the gyro's inertial flywheel relative to the spin axis in a particular directional mode. That is, in the inner hinge unit, the flexure bars have their respective longitudinal axes arranged perpendicular to the spin axis so as to support the flywheel against torsional and radial displacements relative to the spin axis while in the outer hinge unit the flexure bars have their respective longitudinal axes oriented parallel to the spin axis so as to support the flywheel against axial displacements along the spin axis. Furthermore, in each hinge unit the flexure bars comprise locally thin necked-down sections formed by machining a corresponding pair of closely spaced holes completely through the peripheral wall of each unit as the case may be. Thus, when the two units are positioned relative to each other before being rigidly fastened together, the desired exact orthogonal alignment between the flexure bars the outer unit and the corresponding flexure bars in the inner unit may be facilitated by a simple visual inspection thereof.

BRIEF SUMMARY OF THE INVENTION

The present invention relates generally to the art of gyroscopes and more particularly, to an improvement over the "Two-Axis Gyro" fully disclosed in U.S. Pat. No. 3,354,726 by W. J. Krupick and R. F. Cimera. This patent and the present application are commonly assigned.

The prior art gyroscope is of the free-rotor displacement type and features a frictionless universal-joint flexure hinge or suspension for interconnecting the gyro's rotor or inertial flywheel to one end of a motor driven spin shaft or the like. The hinge not only imparts rotation to the rotor from the drive shaft, but moreover, permits simultaneous tilting or pivoting of the rotor about any transverse axis passing perpendicularly through the shaft's spin axis at the center of the hinge. The flexure hinge, it self, actually comprises two units, an inner unit and an outer unit, nested one within the other in a generally concentric and parallel manner. In addition, each respective unit is composed of three gimbals—upper, middle, and lower—and has two quadrature pairs of oppositely disposed flexure bars or elements for interconnecting the gimbals and permitting universal tilting between the upper gimbal and the lower gimbal. The reason two hinge units are required is that the flexure elements, per se, consist of local thin sections of spring metal having substantial strength in only one direction, namely, along the flexure bar's longitudinal axis. Thus, the inner hinge has its flexure bars oriented in such a manner as to contribute high axial strength along the gyro's spin axis whereas the outer hinge has its flexure bars positioned so as to provide the necessary radial and torsional stiffness relative to the gyro's spin axis. During assembly, the upper gimbals of the respective hinge units are fixedly coupled together and to the gyro's rotor while the lower gimbals of the two hinge units are fixedly connected to each other and to the gyro's spin shaft. It will thus be appreciated that when the two hinge units are employed together in this manner, their respective characteristics complement one another to the extend that a unitary, universal-joint flexure hinge assembly is produced which has the required high degree of angular compliance and yet is extremely rigid against all linear displacements both axially and radially with respect to the gyro's spin axis.

In the fabrication of the prior art flexure hinge, the thin flexure sections in each unit are formed by machining four equally spaced pairs of adjacently separated "blind" holes in the peripheral outside wall surface of a hollow cylindrical workpiece. The three gimbals are then formed by making appropriately shaped slots or cuts in the wall of the cylinder thus freeing each gimbal for angular displacement about its respective flexure axis. The two hinge units which at this stage have freely displaceable gimbals are then assembled together as hereinaforesaid. One problem with this procedure is that great care must be taken to insure that the delicate thin flexure sections in each hinge unit are not overstressed or ruptured during assembly since no limit stops are provided to restrict the angular displacement of the respective gimbals.

Another problem arises out of the requirement for exactly aligning the flexure sections in the outer hinge unit with corresponding ones of those in the inner hinge unit so that the flexure axes defined by the extreme necked-down sections in each corresponding aligned pair are colinear. Because the flexure elements are formed by "blind" holes, i.e., holes which are not drilled or bored completely through the wall of the cylinder, it is necessary to position the inner and outer hinge units by resorting to the use of external reference surfaces. In other words, the alignment between the corresponding sensitive thin sections cannot be directly viewed. As a result, slight misalignments between the flexure axes of the two hinge units often occur in production leading to the introduction of excessed and sometimes unsymmetrical spring rates in the finished gyroscope.

Therefore, against this background, it is a primary object of the present invention to provide an improved gyroscope flexure hinge or suspension which may be fabricated in a simpler manner than the prior art hinge resulting in greater accuracy of finish and lower per unit cost.

It is another important object of the present invention to provide an improved gyro flexure having means to facilitate the visual alignment between the corresponding flexure axes in the outer and inner hinge portions thereof.

It is yet another important object of the present invention to provide an improved gyro flexure hinge wherein the inner and outer hinge portions thereof are assembled together when they are in a rigid, unitary state and before they are fully gimballed.

To the accomplishment of these and other objects and advantages, an improved flexure hinge design is disclosed below wherein the hinge unit portion which provides high radial and torsional strength relative to the gyro's spin axis is located or nested within the hinge unit portion contributing high axial strength relative ot said spin axis, rather than vice versa as in the prior art flexure suspension. In addition, the holes machined in each hinge portion to form the flexure elements therein are machined through instead of being "blind"; consequently, when the two hinge portions are assembled together easy visual alignment between the corresponding flexure axes in each unit may be achieved. Moreover, the two hinge units are assembled together when rigid, i.e., before they are fully gimballed. The required cuts are then machined through the integral workpiece to free the gimbals in each hinge portion thereof respectively.

Additional objects and advantages as well as a complete and thorough understanding of the present invention will be made apparent from a study of the following detailed description of the invention in connection with the accompanying drawings.

DETAILED DESCRIPTION OF THE INVENTION

Figure 1:
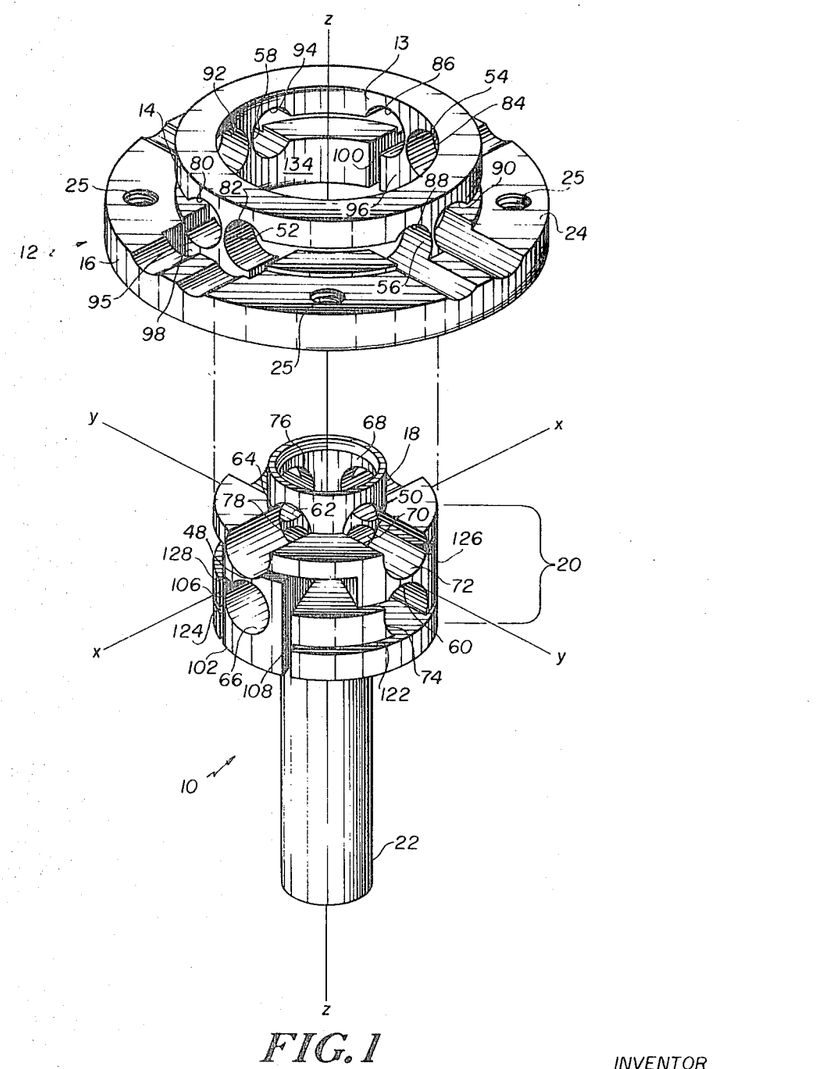
FIG. 1 is a perspective view showing, in assembly, the flexure hinge according to the present invention.
Figure 2:
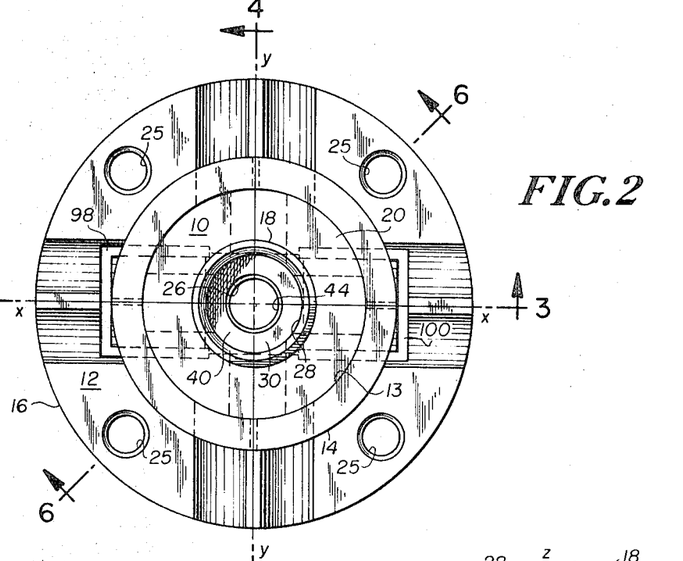
FIG. 2 is a plan view of the flexure hinge assembly.
Figures 3, 4:
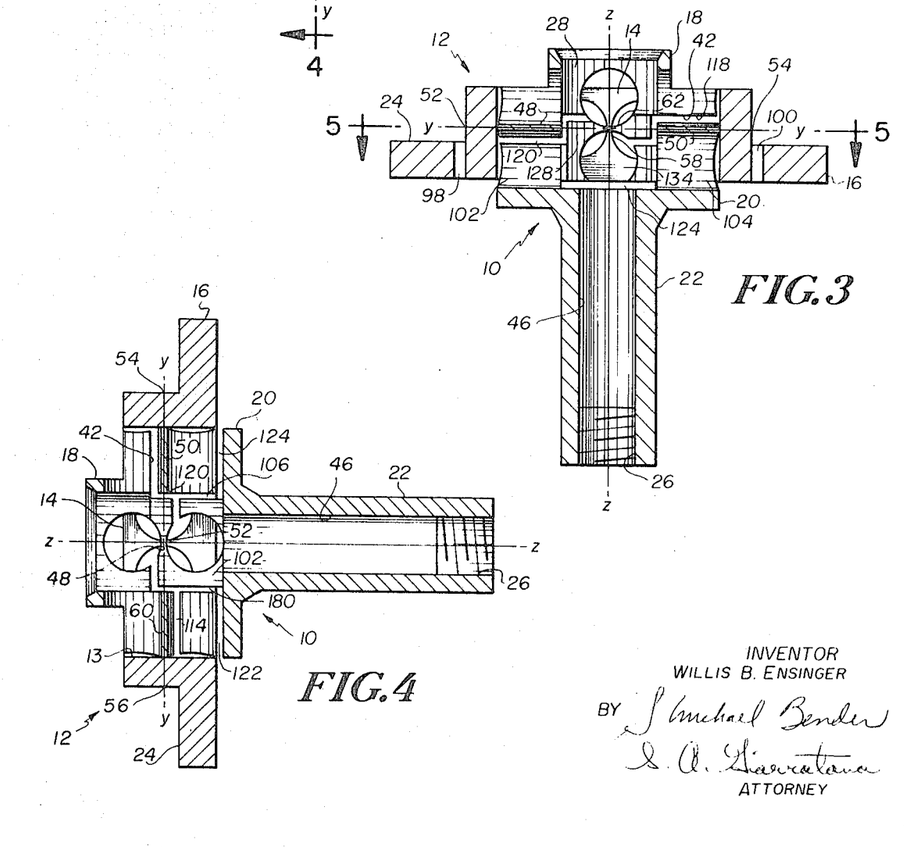
FIG. 3 is a sectional view taken along line 3—3 of FIG. 2.
FIG. 4 is a sectional view taken along line 4—4 in FIG. 2.
Figure 5:
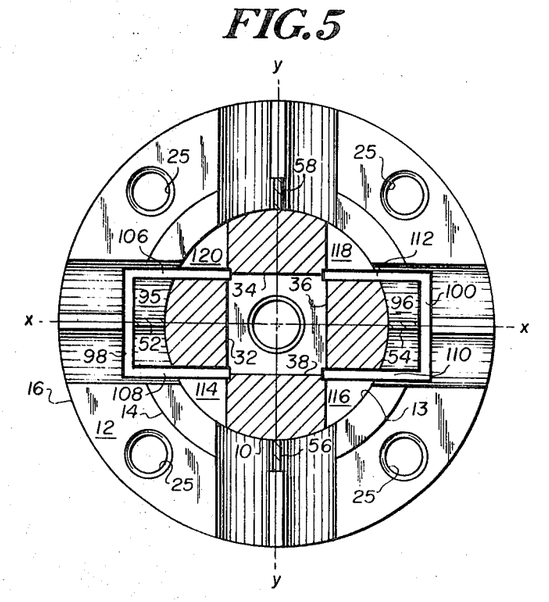
FIG. 5 is a sectional view taken along line 5—5 of FIG. 3.
Figures 6, 7:
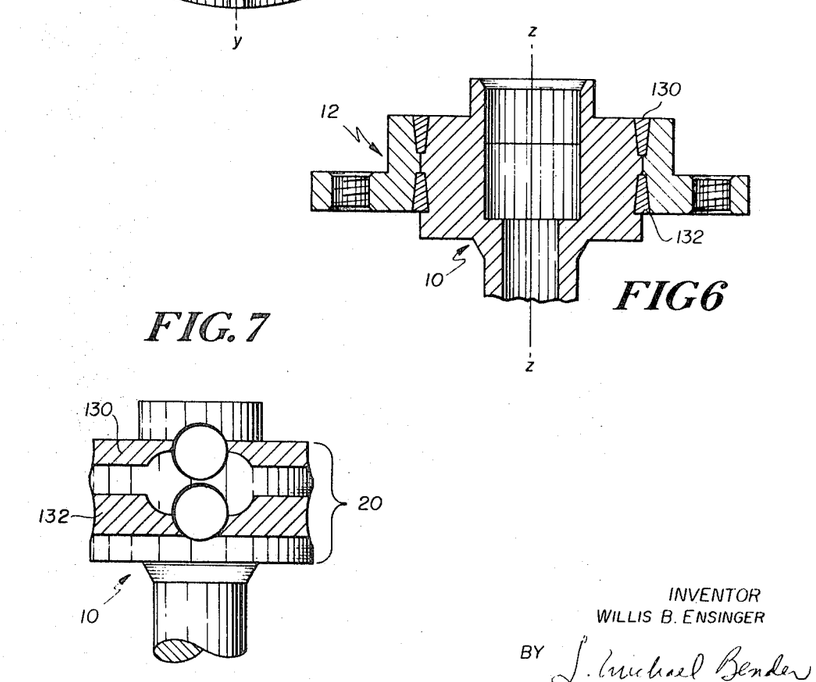
FIG. 6 is a sectional view taken along line 6—6 of FIG. 2.
FIG. 7 is a front view of the inner flexure unit of the present invention showing the plane area of the hinge unit joining weld.

Referring now to FIGS. 1 through 4 in general, and FIG. 1, in particular, there is shown an assembly including an inner hinge or flexure unit 10 and an outer hinge or flexure unit 12. Roughly speaking, each unit comprises a hollow, right-circular cylinder and is coaxially related to a first principal axis indicated by the letter Z. Although the two units are shown axially separated in FIG. 1 for the sake of clarity, they are actually nested, one within the other, in a generally parallel and coaxial manner substantially as shown in FIGS. 2 through 4. It will be understood that the terms "axial" and "radial" as applied herein to the present invention always relate to the Z axis unless specified otherwise.

Outer hinge unit 12 which has a constant diameter central bore or recess 13 includes an upper gimbal ring 14 and a lower radially extending flange portion 16. Inner hinge unit 10 which also has an upper gimbal ring 18 includes, in addition, a radially extending intermediate portion 20 and an elongate lower shaft portion 22. The outside diameter of the inner hinge unit's intermediate portion 20 is sized to fit snugly within the central bore of outer hinge unit 12.

Since the axially upper surface 24 of the outer hinge unit's flange portion 16 is to ultimately serve as the mounting surface for a gyroscopic rotor or inertial flywheel, a series of equiangularly spaced tapped holes 25 is provided in the flange for cooperating with a like series of threaded fastening screws or the like in the rotor whereby the latter may be rigidly attached to the flange. Alternatively, the gyro's rotor may be simply cemented to the axially upper surface 24 of the flange. Similarly, the shaft portion 22 of the lower hinge unit is adapted to be coupled to the output shaft of a gyroscope motor drive assembly. Toward this end a tapped hole 25 is provided at the lower extremity thereof for fixedly connecting the two shafts together with a suitable bolt fastener or the like.

A gyroscopic flywheel and a motor drive assembly suitable for use with the present invention are fully disclosed in the aforementioned Krupick et al. Pat. No. 3,354,726.

In operation, the two hinge units are fixedly fastened together, as will be made more evident below, so that the gyro's motor drive means imparts rotation to the combined hinge assembly causing the rotor to spin about the Z axis. This axis therefore may sometimes be referred to herein as the gyro's "reference" or "spin" axis.

As best seen in FIGS. 2 through 5, the inner hinge unit's upper gimbal ring 18 has a central bore 28 which opens into a cavity 30 central to and substantially within the inner hinge unit's intermediate portion 20. This cavity has a square-shaped horizontal cross-section and therefore has substantially vertical planar walls 32, 34, 36, and 38 in addition to a substantially flat bottom or floor 40. The axial height of walls 32 through 38 is indicated by reference character 42 (FIGS. 2 and 3) which delineates the break between the cylindrically curved surface of central bore 28 and the plane walls of the square cavity 30. It will be noted further that the square-shaped cavity is sized such that in the plan view of FIG. 2 the projection of the inner bore 28 comprises a circle inscribed within the square formed by walls 32 through 38. Floor 40 of cavity 30 communicates with a bore 46 passing through shaft portion 22 via a round hole 44. As indicated in FIG. 2, the gimbal ring's inner bore 28, the intermediate portion's square cavity 30, and the lower shaft's inner bore 46 are respectively coaxial with reference to the Z axis.

Turning again to FIG. 1, each hinge unit has a pair of flexure or pivot axes, labeled X and Y, respectively, which are in quadrature with each other and which are in common intersecting relation with the Z axis, respectively. Inner hinge unit 10 has a first pair of diametrically opposed flexure bars or elements 48, 50 axially displaced along the X axis for permitting the upper gimbal ring 18 to pivot or tilt relative to lower shaft 22 about the X axis. Similarly, outer hinge unit 12 has a first pair of diametrically opposed flexure bars or elements, 52, 54 axially displaced along the X axis for permitting the upper gimbal ring 14 to pivot or tilt relative to lower shaft 22 about the X axis as will be made more obvious below. The outer hinge unit also has a second pair of diametrically opposed flexure bars 56, 58 axially displaced along the Y axis for providing freedom of tilt between the upper gimbal ring 14 and the rotor support flange 16 about the Y axis. Likewise, inner hinge 10 includes a second pair of diametrically opposed flexure bars 60, 62 axially displaced along the Y axis for permitting relative tilt between the upper gimbal ring 18 and the rotor support flange 16 about the axis as will be more fully explained below.

It is an important requirement of the present invention that each and every flexure bar includes a locally thin, necked-down center section for precisely defining its axis of bending. Hence, flexure bars 48 through 62 are formed respectively by machining and then finish grinding a pair of closely spaced holes completely through the peripheral sidewall in each corresponding hinge unit. Thus, for example, flexure bar 48 is formed by machining a pair of closely spaced holes 64, 66 in the sidewall of inner hinge unit 10 with each hole communicating with inner bore 28 and the squared-out cavity 30, respectively. Each of the remaining flexure elements in the inner hinge unit is similarly formed as by machining holes 68, 70; 72, 74; and 76, 78 completely through the peripheral sidewall of the hinge. Likewise, each of the flexure bars in the outer hinge unit 10 is formed respectively by machining four distinct pairs of closely spaced holes completely through the sidewall of this hinge unit, namely, holes 80, 82; 84, 86; 88, 90; and 92, 94.

Preferably, each hinge unit is to be fabricated from material having a relatively high elastic limit. Therefore each flexure bar will act as a flexed spring in bending and will have a definite positive sprng rate associated therewith.

Now in order to provide flexure bars having equal spring rates, it is important that each flexure element have the same thinness at its extreme necked-down center section. To satisfy this proviso, holes 78 through 92 have equal diameters and, of course, the spacing between the holes in each pair is the same. Moreover, each pair of holes is machined so that their centerlines are parallel to each other and to either the X or Y axis as the case may be, respectively. This will insure that the cross-sectional thinness of each flexure bar is uniform along its transverse dimension at the extreme necked-down portion thereof.

It will be appreciated that the flexure bars 52 through 58 in the outer hinge unit 12 have their respective longitudinal axes parallel to the Z axis whereas flexure bars, 50, 60, and 62 in the inner hinge unit 10 have their corresponding longitudinal axes respectively normal to the Z axis. With this arrangement, the flexure bars in the outer unit provide axial support in tension or compression against axial loads imposed upon the gyro's rotor or inertial flywheel while the flexure bars in the inner hinge unit provide maximum support in tension or compression against radial and/or torsional loads imposed upon the gyro rotor. In this connection, it will be noted that the transverse dimension of the flexure bars in the outer hinge unit is approximately one-half that of the corresponding transverse dimension of the flexure bars in the inner hinge unit. This is because under axial loading all four flexure bars in the outer unit act together in parallel in tension or compression to resist linear displacement of the gyro rotor. However, under a given radial load, it will be seen that only two flexure bars in the inner hinge unit will be so oriented as to resist such radial loading in tension or compression at any given moment. Suffice it to say therefore that the transverse dimensions of the respective flexure bars are chosen to provide equal deflection gradients along and at right angles to the spin axis over a wide range of loading conditions.

In addition to supporting the gyroscope's rotor against linear displacements, both axial and radial, the flexure assembly according to the present invention must furthermore permit tilting of the rotor about any transverse axis normal to the gyro's reference or spin axis during rotation thereabout. Generally speaking, this is accomplished by attributing to the flexure assembly two degrees of freedom in bending about the X and Y axes, respectively. Since these axes and the rotation axis form a set of three intersecting mutually orthogonal axes, it is obvious that the flexure assembly, in fact, functions as a universal-joint coupling the gyro's rotor to the gyro's motor drive output shaft. Moreover, inasmuch as the outer hinge unit and the inner hinge unit function in parallel, it follows that each unit must by itself act independently as a two-axis, universal-joint coupling. For example, consider the outer hinge unit 12. Flexure bars 56 and 58 connect the upper gimbal ring 13 to the rotor mounting flange 16 and permit relative tilting therebetween about the Y axis. Note however, that flexure bars 52 and 54 are integrally connected to a pair of diametrically opposed downwardly extending wall portions 95 and 96 which are cut completely away respectively from the inner cylindrical wall of the outer hinge unit by a pair of U-shaped slots 98 and 100, respectively. If we assume for the moment, that somehow these cutaway wall portions 95 and 96 are fixedly connected to the gyro's motor drive output shaft then it will be seen that the upper gimbal ring 13 may freely pivot relative to the output shaft via bending of flexure bars 52 and 54 about the X axis. With reference to the outer hinge unit therefore, upper gimbal ring 13 together with its four flexure bars 52 through 58 may by itself function as a two-axis universal-joint member coupling the rotor mounting flange to the motor drive output shaft.

Figure 8:
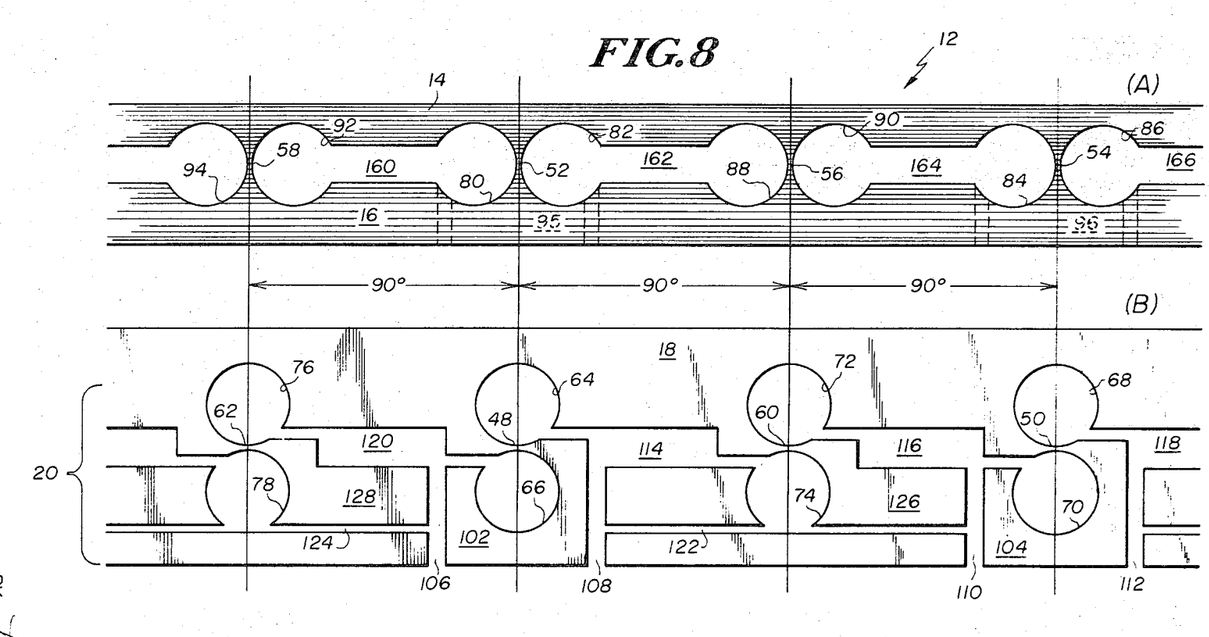
FIG. 8, parts A and B, are unwrapped elevation views showing each hinge unit's peripheral outside wall surface, respectively.
Figure 9:
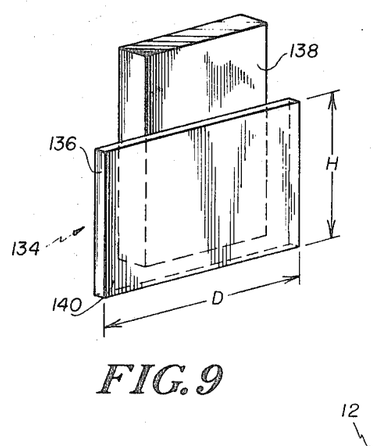
FIGS. 9, 10, and 13 are views showing the shape of the EDM electrodes used in fabricating the present invention.

A similar analysis may now be made with respect to the inner hinge unit with the aid of FIG. 8, part B, which shows an unwrapped view of the outside cylindrical surface of this hinge unit. Upper ring gimbal 18 is integrally connected through flexure bars 48 and 50 to a pair of diametrically opposed upwardly extending sidewall portions 102 and 104 (see FIGS. 3 and 4) which, in turn, are integral with lower shaft portion 22. The sidewall portions 102 and 104 are additionally separated from the remainder of the sidewall by two pairs of parallel cuts or slots 106, 108 and 110, 112, respectively. As clearly shown in FIG. 5, slots 106 through 112 are extensions of the U-shaped cuts 98, 100, respectively and extend completely through the sidewall of the inner hinge unit into the square-shaped cavity 30 wherein they each intersect a separate corner thereof. A series of four wedge-shaped radial slots 114, 116, 118, and 120, each of which has a generally Z-shaped cross-section, also extends completely through the sidewall of the inner hinge unit opening up into the square-shaped cavity therein at a separate corner thereof. It will be noted that slot 114 communicates laterally with hole 64 on the one hand and hole 74 on the other hand. Likewise, slot 116 laterally joins holes 50 and 78, slot 120 removes a Z-shaped sidewall portion from between holes 76 and 66. The intersection of Z-shaped slots 114, 118, and 120 with corresponding corners of the square cavity 30 may clearly be seen, for example, in FIGS. 3 and 4. Inner hinge unit 10 also contains a pair of planar chordal slots 122 and 124 which extend substantially parallel to the X axis and radially inward toward the Z axis and upstanding wall portions 102 and 104. As more clearly shown in FIGS. 1 and 4 chordal slots 122, 124 actually terminate at the parallel upstanding sides of wall portions 102, 104, respectively, in intersecting relation with U-shaped slot extension 108, 110, and 106, 112, respectively.

One effect of the U-shaped slot extensions 106 through 112, the Z-shaped slots 114 through 120, and the chordal slots 122, 124 is to completely free a pair of diametrically opposed, oppositely extending sidewall portions 126 and 128 for bending about the Y axis relative to upper gimbal ring 18 through flexure bars 60 and 62. Another effect is to completely free the lower shaft portion 22 for bending about the X axis relative to upper gimbal ring 18 via upstanding wall portions 102, 104 and flexure bars 48, 50. If we again momentarily assume that sidewall portions 126 and 128 may somehow be fixedly connected to the gyro's inertial flywheel then it will be appreciated that inner hinge 10 also has the capability of functioning independently as a two-axis, universal-joint coupling interconnecting the gyro rotor to the motor drive output shaft.

In accordance with another important feature of the present invention, the inner and outer hinge units are immediately and permanently joined together in a fixed and rigid manner subsequent to the machining of holes 64 through 92 in each corresponding unit, respectively. Then, and only then, are the U-shaped slots, Z-shaped slots, and chordal slots machined in the integral unitary workpiece to free the gimbal rings for flexure about the X and Y axes, respectively.

Before they are permanently joined, however, great care should be exercised in aligning the two hinge units so that each flexure bar in the outer unit is positioned relative to a corresponding flexure bar in the inner hinge in a preferred manner. This desired arrangement requires that: (1) each flexure bar in the outer hinge unit have its longitudinal axis aligned normal to the longitudinal axis of its corresponding flexure bar in the inner hinge unit, (2) each pair of juxtaposed flexure bars have a common flexure axis, (3) the flexure axis common to each set of diametrically opposed flexure bar pairs be colinear with respect to the X and Y axes, respectively, and (4) each pair of corresponding flexure bars has its flexure axis lying in the X–Y plane. Obviously, the extent toward which the above-mentioned desideratum may be achieved will be proportional to the accuracy with which holes 64 through 92 are machined in each hinge unit, respectively. Nevertheless, much also depends upon the accuracy with which the two units are aligned before being rigidly connected together. Since the holes 64 through 92 are machined completely through the side walls in each hinge unit, respectively, visual alignment between each pair of corresponding flexure bars is greatly facilitated and this represents still another important aspect of the present invention. Thus, as illustrated to good effect, for example, in FIGS. 3 and 4, the preferred alignments between flexure bars 58 and 62 on the one hand, and flexure bars 52 and 48 on the workpiece (i.e., the integral structure comprising inner hinge 10 welded to outer hinge 12) with the longitudinal axis of the flat plate aligned colinearly with the workpiece's Z-axis and the former's transverse axis aligned parallel to the latter's Y-axis. The electrode tool is then lowered into the workpiece until the lowermost edge 140 of the plate barely clears the floor 40 of cavity 30. The electrode is then advanced to the right as viewed in FIG. 5 until the right hand portions of walls 34 and 38 and wall 36 are squared-off whereupon the tool is withdrawn back into the central plane including the Z-axis. At this point the workpiece is rotated or indexed 180° about its Z-axis and the tool is once more advanced to the right squaring off the left hand portions of walls 34 and 38 and wall 32 as viewed in FIG. 5. The tool is then finally withdrawn toward the center of the cavity 30 and axially lifted from the workpiece. Alternatively, the squared-out cavity 30 may be machined in the inner hinge unit by the same method and before the two hinge units are welded together as will be obvious to those persons skilled in the art.

Figure 10:
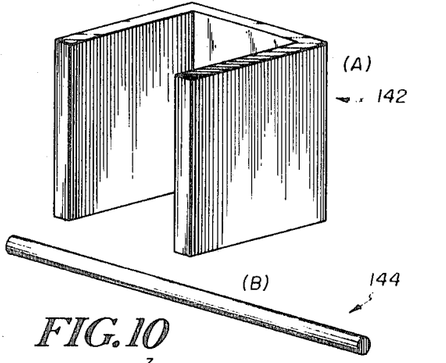
Figure 11:
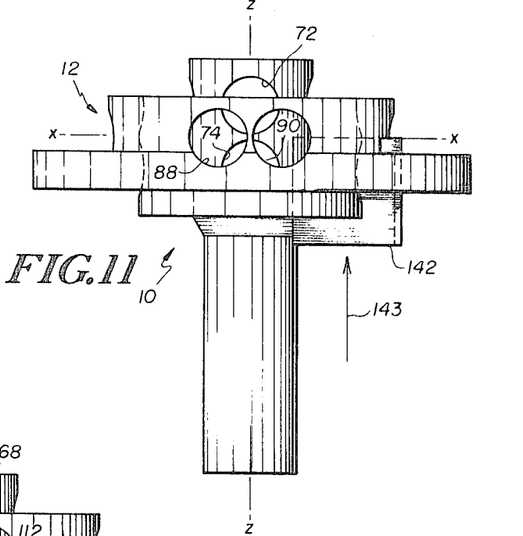
FIGS. 11, 12, and 14 are side, front, and plan views showing steps in the fabrication of the present invention.

For forming the U-shaped slots 98, 100 and the chordal slots 122, 124, a pair of electrode tools 142 and 144 is provided as shown respectively in FIG. 10, parts A and B. Electrode 142 comprises a U-shaped channel having a cross-section equal to the dimensions of the U-shaped slots 98, 100 again undersized all around by the dimensions of the spark gap. In setting up for the U-shaped cut 98, for example, electrode 142 is positioned axially below the undersurface of the inner hinge's intermediate portion 20 with its open end parallel to the Y-axis and facing inward toward the Z-axis while its cross-section is symmetrically disposed about the X-axis. As shown in FIG. 11, the tool is then advanced axially upward in a direction indicated by arrow 143 (i.e., parallel to the Z-axis) until the upper surface of the tool lies in the X–Y plane. Electrode 142 is then withdrawn axially downward, the workpiece indexed 180° with respect to its Z-axis, and the tool is again advanced axially upward toward the X–Y plane whereby the other U-shaped cut 100 is completed.

Figure 12:
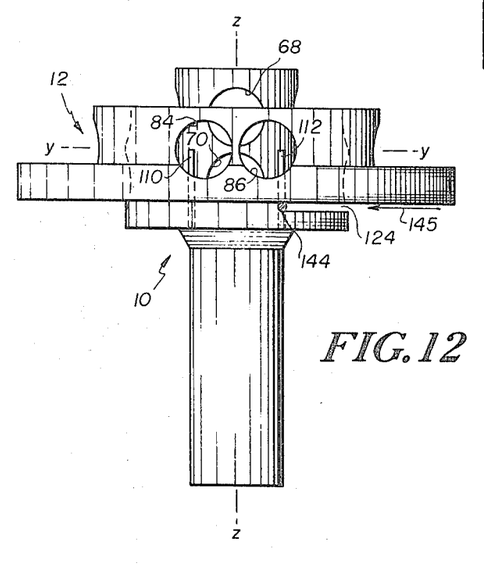

Chordal slots 122, 124 which are relatively simple, straight planar cuts, are machined with electrode 144, the latter merely comprising an elongate straight wire or round bar having a diameter equal to the slot dimensions undersized by the electrode gap spacing. As shown in FIG. 12, electrode 144 is positioned with its longitudinal axis parallel to the X-axis and is then advanced into the workpiece in the direction indicated by arrow 145, namely, parallel to the Y-axis, until slot 124 communicates with extension 112 of U-shaped slot 100. The electrode is then withdrawn, the workpiece indexed 180° about its Z-axis, and slot 122 is subsequently machined in similar fashion.

Figure 13:
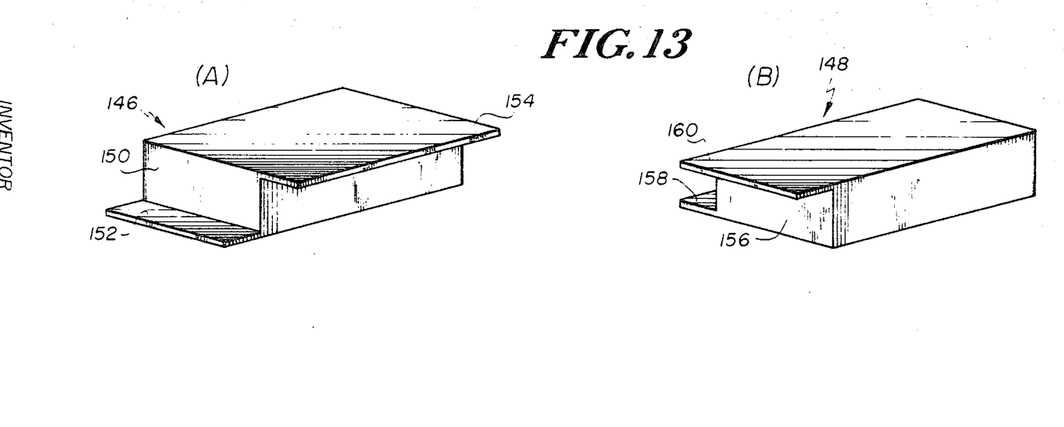
Figure 14:
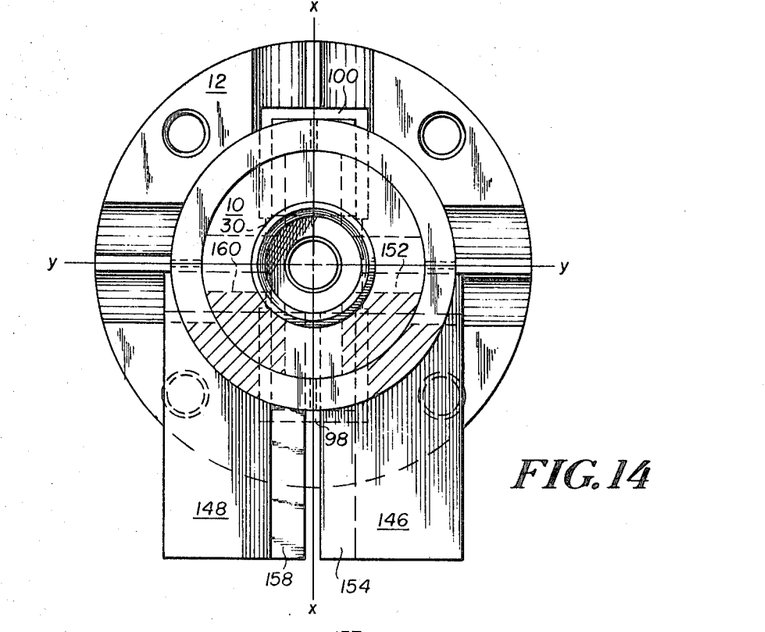

All that remains now to complete the final assembly of the flexure hinge is the machining of the Z-shaped slots 114 through 118. This is accomplished in accordance with the principles of the invention by employing the two electrode tools 146, 148 as shown in FIG. 13, parts A and B, respectively. Electrode 146 includes a rectangular main body portion 150, a first longitudinally extending thin rectangular lip 152 forming an extension of the lower surface of the rectangular main body portion, and a second laterally extending thin rectangular lip 154 forming an extension of the upper surface of the rectangular main body portion. Electrode 148 is identical to electrode 146, but is rotated 180° about its longitudinal axis. Hence electrode 148 has a first thin rectangular lip 158 extending laterally from the lower surface of the main body portion 156 thereof, and a second thin rectangular lip 160 extending longitudinally from the upper surface of the rectangular main body portion thereof. As shown in FIG. 14, the two electrodes are positioned symmetrically about the X-axis and advanced simultaneously into the workpiece in the direction of arrow 157, that is, parallel to the X-axis, thus forming two of the Z-shaped slots simultaneously.

The electrodes are then withdrawn, the workpiece indexed 180° about its Z-axis, and the tools advanced once more into the workpiece to complete the formation of the remaining two Z-shaped slots. Note that at their maximum extent, each electrode tool 146, 148 removes a wedge-shaped piece of material from the inner hinge and an annular portion from the outer hinge as indicated by the shade lines in FIG. 14. The removal of each annular portion of material from the outer hinge results in the formation of four rectangular slots 160, 162, 164, and 166 as may be more fully appreciated, for example, by referring to FIG. 8, part A, wherein there is shown an unwrapped view of the outside peripheral wall surface of the outer hinge unit.

Figure 15:
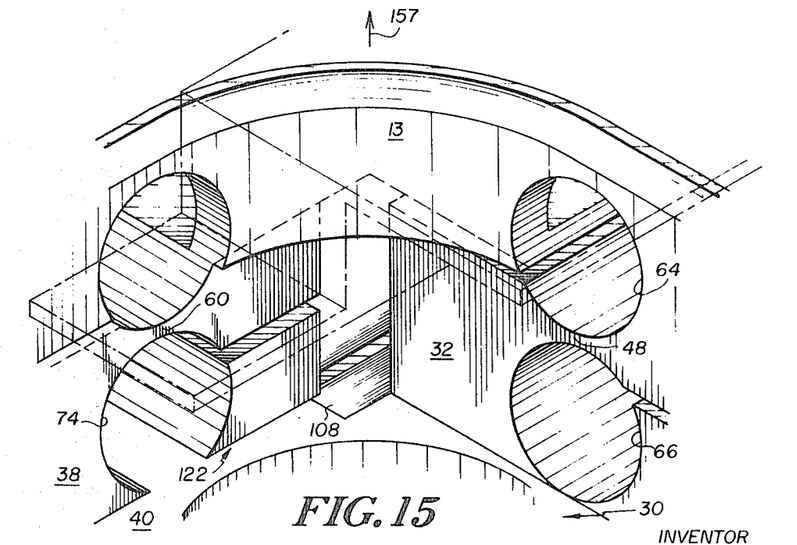
FIG. 15 is perspective detail showing a portion of the present invention.

The four slots 160 through 166 together with their corresponding Z-shaped slots 120, 114, 116, and 118 effectively free the integral gimbal ring structure 13, 18 for relative tilting between the rotor support flange 16 and the elongate shaft portion 22 about the X–Y axes, respectively. This may be more completely understood, for example, by referring to FIG. 15 which is a perspective view showing in detail one inside corner of the square-shaped cavity 30. The electrode tool 146 is shown at its maximum depth of cut during the formation of say, Z-shaped slot 114; however, it is to be assumed that the remaining three Z-shaped slots have already been formed. Note how the two orthogonal extending lip portions of electrode 146 extend respectively into through-holes 64 and 74 and how the corner of the main body portion of the electrode cuts away a corresponding portion of the corner of the square-shaped cavity 30 between the latter's wall surfaces 32 and 38. The portion of the corner immediately below the electrode tool had previously been removed by the slot extension 108 formed by U-shaped cut 98. Bearing in mind that wall surface 32 actually represents the inner surface of upstanding wall portion 102 and that wall surface 38 actually comprises the inner surface of wall portion 126, and recalling that chordal slot 122 had previously freed the wall portion 126 from the floor 40 of cavity 30 (hence, lower shaft portion 22), it is now clearly apparent that the wall portion 126 has the necessary freedom to pivot about the Y-axis relative to upper gimbal ring 18 through flexure bar 60 and that the upper gimbal ring 18 may similarly pivot about X-axis relative to upstanding wall portion 102 through flexure bar 48. The remaining three corners of square-shaped cavity 30 are cut away in identically the same manner to produce the required gimbal action as detailed hereinabove.

As previously mentioned, in gyroscope flexure hinges of the type described herein, the flexure bars act as spring elements exerting positive spring rate restoring forces when they are in their flexed condition, that is, when the gyro's rotor pivots relative to the spin axis, for example. These forces tend to oppose the rotor's displacement and thereby act as restraining torques on the rotor causing it to drift at right angles to the original displacement. In order to cancel out such undersirable torque restraints, so-called spring rate compensation means are usually provided. A spring rate compensator suitable for use with the present invention is disclosed in the aforementioned patent to Krupick et al., U.S. Pat. No. 3,354,726; however, it is anticipated that the improved spring rate compensation means disclosed in copending application Ser. No. 761,148, entitled Method and Means for Calibrating Spring Rate and Gimbal Unbalance in Free-Rotor Flexure Suspended Gyroscopes, by George S. Macor et al., and assigned to the assignee of the present invention, will be preferred by those skilled in the art. In any event, it will be noted that the spring rate compensator is to be fixedly and concentrically mounted within the flexure hinge's "tunable" portion, that is, the portion of the hinge which oscillates when the spinning rotor is tilted relative to the spin axis. For example, in the prior art hinge, the "tunable" element comprises the middle gimbal portion of the inner hinge unit whereas in the present invention the "tunable" element comprises the integral upper gimbal ring structure 14, 18.

What is claimed is:

1. A universal joint flexure assembly having three principal mutually orthogonal commonly intersecting axes of symmetry comprising
   a main gimbal in the form of an annulus,
   a radially extending flange member axially displaced from said gimbal along a first one of said axes, said flange member being supported from said gimbal by a pair of flexure bars displaced along a second one of said axes for permitting relative tilting between said flange and said gimbal about said second one of said axes, and
   a pair of supporting members displaced along a third one of said axes and being coupled to said gimbal through a second pair of flexure bars in quadrature with said first pair whereby said gimbal is permitted to tilt about said third one of said axes relative to said supporting members, wherein each of said flexure bars comprises a locally thin section formed in the wall of said main gimbal and has a transverse dimension equal to the width of said main gimbal wall, and wherein each of said locally thin sections is disposed respectively between a pair of closely spaced hole portions, said hole portions extending through the wall of said main gimbal, the respective centerlines of said hole portions in each corresponding pair being parallel to each other and lying in a plane defined by said second and third axes, respectively, and wherein each said flexure bar includes a necked-down center portion having an axis of tilt located in said plane and normally intersecting said first axis.

2. The apparatus of claim 1 wherein said pair of supporting members have a supporting shaft, said supporting shaft being fixedly connected to said pair of supporting members coaxially therewith along said first one of said axes.

3. The apparatus of claim 2 wherein said flange includes a plurality of spaced hole portions for ease of connection to a flywheel and said supporting members are adapted to be rotated in fixed displaced relation about said first axis by said gyroscope drive means.

4. The apparatus of claim 2 wherein said flexure bars extend in an axial direction substantially parallel to each other and to said first one of said axes for ease of resisting axial loads.

5. A universal joint flexure assembly having three principal mutually orthogonal and intersecting axes of symmetry comprising
   a main gimbal,
   an elongate shaft portion, and an intermediate hollow portion coaxial with said gimbal and said shaft portion along a first one of said axes,
   said intermediate portion including two pairs of diametrically opposed flexure bars adapted for bending about a second one of said axes and a third one of said axes respectively, one of said pairs of flexure bars coupling said gimbal to said intermediate portion and the other pair of said flexure bars coupling said intermediate portion to said shaft, wherein each of said flexure bars comprises a locally thin section formed in the wall of said hollow intermediate portion and each said section having a transverse dimension equal to the wall thickness of said hollow intermediate portion, and wherein each of said locally thin sections is disposed respectively between a pair of closely spaced hole portions which extend completely through the wall of said hollow intermediate portion, the respective centerlines of said hole portions in each corresponding pair being parallel to each other and in intersecting relation with said first axis, respectively, and wherein each said locally thin section of said flexure bar includes a necked-down center portion having a bending axis normally intersecting said first axis and being located in the plane defined by said second and third axes.

6. The apparatus of claim 5 wherein said intermediate portion includes an annular portion fixedly connected thereto coaxially therewith, said annular portion including a radially extending flange portion, and said elongate shaft portion is adapted to be rotated about said first axis by a gyroscope drive means.

7. The apparatus of claim 5 wherein said intermediate portion has a radially extending outer annular portion connected thereto, and said main gimbal has a radially extending outer flange portion connection thereto, said outer annular member having two pairs of diametrically opposed flexure bars supporting said outer flange portion.

8. The apparatus of claim 7 wherein each of said flexure bars of said outer annular portion has its longitudinal axis parallel to said first axis respectively whereby said outer annular portion of the flexure assembly has maximum strength along said first axis for resisting axial loads.

9. The apparatus of claim 8 wherein each of said flexure bars of said intermediate portion has its longitudinal axis disposed in a plane normal to said first axis whereby said intermediate portion of the flexure assembly has maximum strength in the radial direction relative to said first axis for resisting shear and torsion loads.

10. The combination comprising,
    an inner universal-joint flexure hinge, and
    an outer universal-joint flexure hinge,
    said inner and outer flexure hinges being concentrically disposed about a set of three principal mutually orthogonal and intersecting axes wherein
    said inner flexure hinge includes:
    an inner gimbal, an intermediate portion, and an elongate shaft portion disposed coaxially along a first one of said axes,
    said intermediate portion having first and second pairs of diametrically opposed flexure bars for bending about a second one and a third one of said axes, respectively, said first pairs of flexure bars being integral between said gimbal and said intermediate portion and said second pair of flexure bars being integral between said intermediate portion and said elongate shaft; and wherein said outer flexure hinge includes:
    an outer gimbal, a radially extending flange member, and a pair of diametrically opposed support members, said gimbal, flange members, and support members being disposed coaxially along said first axis,
    said flange member being integrally connected to said outer gimbal through a third pair of diametrically opposed flexure bars for permitting relative bending between said flange and said gimbal about said second axis, and said outer gimbal being integrally connected to said supporting members through a fourth pair of diametrically opposed flexure bars for permitting relative bending between said outer gimbal and said pair of supporting members about said third axis;
    said first and second pairs of flexure bars in said inner flexure hinge having their longitudinal axes parallel to said first axis and said third and fourth pairs of flexure bars in said outer flexure hinge having their longitudinal axes perpendicular to said first axis.

11. The combination of claim 10, in which said first axis comprises the spin axis of a gyroscope,
    said radially extending flange member includes means for supporting a gyroscopic inertial flywheel, and wherein
    said elongate shaft is adapted for rotation about said spin axis by a gyroscope drive means.

12. The combination of claim 10 wherein
    said inner and outer gimbals are rigidly fastened together, said pair of diametrically opposed supporting members in said outer flexure hinge are rigidly fastened to a pair of corresponding cut away diametrically opposed wall sections in said inner hinge's intermediate portion, and said pair of cut away wall sections are integral with said second pair of flexure bars at their respective one ends and are integral with said elongate shaft at their respective other ends.

13. The combination of claim 10 wherein said inner and outer gimbals are rigidly fastened together, said flange member is rigidly fastened to a pair of diametrically opposed wall sections in said inner hinge's intermediate portion, and said diametrically opposed wall sections are entirely cut away from the remainder of said intermediate portion but for the integral connection thereof respectively with said third pair of diametrically opposed flexure bars.

14. In a gyroscope rotor suspension having an inner, four-bar, two-axis, universal-joint flexure hinge and an outer, four-bar, two axis, universal-joint flexure hinge the method of assembly comprising the steps of:

machining four equiangularly arranged pairs of adjacently spaced holes through the wall of a hollow cylindrical workpiece to form said inner hinge unit wherein said flexure bars comprise the respective necked-down wall portions between each pair of adjacently spaced holes, machining four equiangularly arranged pairs of adjacently separated holes through the wall of a hollow cylindrical workpiece having an inside diameter substantially equal to the outside diameter of said first cylindrical workpiece to form said outer hinge unit wherein said flexure bars comprise the respective necked-down wall portions between each pair of adjacently spaced holes, said wall portions in said outer hinge unit being orthogonally oriented relative to the wall portions in said inner hinge unit, positioning the inner hinge unit concentrically within the outer hinge unit whereby said orthogonally oriented wall portions common to said hinge units respectively have their extreme necked-down portions in corresponding alignment, fixedly fastening said inner hinge unit to said outer hinge unit to form a rigid unitary structure.

machining a series of slots in said rigid unitary structure sufficient to permit a portion of said outer hinge unit to pivot relative to a portion of said inner hinge about a pair of orthogonal axes defined respectively by the alignment of said orthogonally oriented wall portions, said axes being normal and in common intersecting relation with a reference axis passing longitudinally and centrally through said rigid unitary workpiece.

References Cited

UNITED STATES PATENTS

| 3,081,552 | 3/1963 | Reason | 74—5 X |
| 3,264,880 | 8/1966 | Fischel | 74—5 |
| 3,290,949 | 12/1966 | Samet | 74—5 |
| 3,354,726 | 11/1967 | Krupick et al. | 74—5 |
| 3,427,828 | 2/1969 | Stiles | 74—5 X |

MANUEL A. ANTONAKAS, Primary Examiner

U.S. Cl. X.R.

308—2